United States Patent [19]

Maselli et al.

[11] 4,456,622

[45] Jun. 26, 1984

[54] COMBINATION SEMI-CONTINUOUS AND BATCH PROCESS FOR PREPARATION OF VINEGAR

[75] Inventors: John A. Maselli, Wilton; Robert O. Horwath, Westport, both of Conn.

[73] Assignee: Nabisco Brands, Inc., Parsippany, N.J.

[21] Appl. No.: 447,047

[22] Filed: Dec. 6, 1982

[51] Int. Cl.³ .............................. C12J 1/00; C12P 7/54
[52] U.S. Cl. ....................................... 426/17; 435/140
[58] Field of Search .......................... 426/7, 17, 592; 435/161, 162, 140, 823

[56] References Cited

U.S. PATENT DOCUMENTS

| | | | |
|---|---|---|---|
| 3,445,245 | 5/1969 | Ebner | 426/17 |
| 3,779,868 | 12/1973 | Nikolaev et al. | 426/17 |
| 4,076,844 | 2/1978 | Ebner et al. | 426/17 |
| 4,282,257 | 8/1981 | Kunimatsu et al. | 426/17 |
| 4,364,960 | 12/1982 | Kunimatsu et al. | 426/17 |

*Primary Examiner*—Robert A. Yoncoskie
*Assistant Examiner*—Marianne S. Minnick
*Attorney, Agent, or Firm*—R. Kornutik

[57] ABSTRACT

Vinegar having an acetic acid content of 18–20% is produced by aerobic bacterial oxidation of ethanol in a combination of semi-continuous fermentation and batch fermentation. The semi-continuous fermentation provides 10–12% vinegar, a portion of which is then converted to 18–20% vinegar in a batch fermentor operating at a temperature substantially lower than that employed in the semi-continuous fermentation. Gas is admixed with the fermentation mixture prior to its being subjected to microfiltration or ultrafiltration during its transfer from the semi-continuous fermentor to the batch fermentor.

17 Claims, 2 Drawing Figures

COMBINATION SEMI-CONTINUOUS AND BATCH PROCESS FOR PREPARATION OF VINEGAR

BACKGROUND OF THE INVENTION

1. Field of the Invention

This invention relates to the preparation of vinegar by the aerobic fermentation of ethanol. More particularly, it relates to the use of semi-continuous and batch fermentation in the production of vinegar. This invention especially relates to the utilization of membrane filtration and the combination of semi-continuous and batch aerobic conversion of ethanol by Acetobacter bacteria in the production of vinegar.

2. Description of the Prior Art

Vinegar has been produced for centuries by the aerobic bacterial fermentation of ethanol. In the presence of bacteria of the genus Acetobacter, oxygen oxidizes ethanol to acetic acid, a dilute solution of which is vinegar. The bacteria utilized is referred to in the art as vinegar bacteria.

As employed herein, the concentration of alcohol is expressed in volume by volume and the concentration of acetic acid in weight by volume. The sum of percent weight by volume of acetic acid and percent volume by volume of alcohol is called total concentration. Since 1% volume by volume of alcohol is oxidized during fermentation to almost exactly 1% weight by volume of acetic acid, the total concentration thus means the maximum acidity to which a mash can theoretically be fermented.

Improvements have been made over the years in the conventional batch fermentation process so that today vinegar is produced by semi-continuous and continuous processes. Since the fermentation conversion of ethanol is an exothermic process, the temperature of a fermentation mixture will slowly increase with time unless cooling is provided. Also, as a batch of alcohol is converted to vinegar the concentration of alcohol decreases while the concentration of acetic acid increases. Both high temperature and high acid concentration suppress the growth of vinegar bacteria and are therefore considered undesirable in the commercial production of vinegar. Cooling of the batch mixture has been employed to maintain a fermentation temperature of below 30° C. and the acetic acid concentration has been limited in some cases to no more than 7%. This has achieved satisfactory bacteria growth but has resulted in lowering the rate of production of vinegar. In another approach to the problem, attempts have been made to develop strains of vinegar bacteria which will grow at higher rates in high acetic acid concentrations and at high fermentation temperatures. The efforts to date have been time consuming and the results have not been as good as expected.

Other efforts have been directed to improving the production rate of vinegar by increasing the concentration of the bacteria in the fermentation mash by other means, such as recovering the bacteria when the fermented mash is removed from the fermentor and returning the bacteria to the fermentor. Such methods as centrifugation ad precipitation have been suggested to recover the bacteria. Limited success has been achieved by these approaches because the mechanical forces often injure the bacteria and the period of time during which the bacteria is denied oxygen results in the death of a high percentage of vinegar bacteria. Methods of separating the mash from the bacteria within the fermentor keep the bacteria in an oxygen environment but maintenance of the equipment has proven troublesome.

Membrane filtration is employed when small particles and/or macromolecules are to be recovered or removed from a liquid. Membranes of varying porosity are employed and the nature of the retained materials may be employed in classifying the types of membrane filtration: microfiltration, ultrafiltration and reverse osmosis. Ambiguity and overlapping of the size of particulates or molecules retained by the membranes employed in these several processes has occurred in the field. In general the pores of the membranes employed in microfiltration are too large to retain macromolecules in solution but will retain particulates, organisms, colloids and viruses. Ultrafiltration membranes will retain macromolecules in the 300 to 300,000 molecular weight range, e.g., proteins, carbohydrates and polymers. Reverse osmosis membranes will retain ionic species, e.g., $NaCl$, $MgSO_4$, which generally pass through microfiltration and ultrafiltration membranes. Since ionic species have relatively high osmotic pressures, reverse osmosis is a relatively high pressure (400–1000 psi) process while microfiltration and ultrafiltration are practiced at much lower pressures (1–100 psi). (See, Porter, M. C., Selecting the Right Membrane and Making It Work, presented at the 79th Annual Meeting of A.I.Ch.E.).

Ultrafiltration membranes are classified by their nominal molecular weight cutoff or fractionation, i.e., a 10,000 mw cutoff membrane will retain materials of 10,000 molecular weight and above. Microfiltration membranes are described by their porosity, usually in terms of micrometers. Tangential flow is conventionally employed in membrane filtration to prevent a build-up of retained material at the filtering surface. This type of flow is inherent in micro and ultrafiltration. As used herein the term membrane filtration, will include only relatively low pressure membrane filtration, micro and ultrafiltration, i.e. reverse osmosis will not be included.

One vinegar recovery method disclosed in Japanese Patent Publication No. 8150-1980, published Mar. 1, 1980, involves the use of ultrafiltration in either a semi-continuous or a continuous vinegar process. A hollow fiber ultrafiltration unit having a nominal molecular weight fractionation of 13,000 is employed. In the subject process it is used to retain the vinegar bacteria. The mash, removed from a fermentation vessel employing an aerobic bacterial vinegar fermentation procedure, is subjected to ultrafiltration producing a clear mash containing no vinegar bacteria and a mash containing the bacteria in a concentration greater than that in the mash removed from the fermentor. The clear mash is discharged for recovery of the vinegar while the bacteria-rich mash is returned to the fermentation vessel to raise the bacteria concentration level of the mash in the fermentor. In the disclosed process the bacteria-rich mash must be returned to the fermentor within one minute after the mash is removed from the fermentor because of the physiology of the vinegar bacteria.

In commonly assigned and copending patent application Ser. No. 437,425, filed Oct. 28, 1982, incorporated herein by reference, quantities of gas, such as, air, or mixtures of air and carbon dioxide or nitrogen, are added to a vinegar mash prior to micro or ultrafiltration. Substantially more of the liquid passes through the filter membrane than if the mixture were subjected to substantially the same membrane filtration without having been mixed with gas. The retained concentrate of the vinegar bacteria and the remaining liquid containing ethanol and acetic acid are returned to the fermentation vessel so as to increase the bacteria level therein thereby causing a concomitant increase in the rate of fermentation.

U.S. Pat. No. 4,076,844 of Ebner et al. discloses a two stage serial fermentation process for producing vinegar with an acetic acid concentration of more than 15%. In the first stage, the alcohol-containing mixture is fermented whereby both bacteria multiplication and acidification take place at a temperature of 27°-34° C. to provide an acetic acid concentration which does not exceed 15%. In the second stage the fermentation is continued at the same temperature as in the first stage. Acidification takes place in this second stage but bacteria multiplication decreases and then stops to provide an acetic acid concentration above 15%. The fermentation may be conducted in two vessels with a portion of the mash transferred from the first to the second fermentor. While the fermentation is concluded in the second fermentor, the first fermentor is re-supplied and the initial fermentation is continued in a semi-continuous fashion.

U.S. Pat. No. 4,282,257 of Kunimatsu et al. also discloses a two stage serial fermentation process for producing vinegar. In the first stage, the fermentation is conducted at a temperature of 27°-32° C. until the acetic acid concentration reaches 12-15%. In the second stage, the fermentation is continued at a temperature of 18°-24° C. until an acetic acid concentration higher than 18% is obtained. The fermentation may be conducted in a single fermentor or in two fermentors in a fashion similar to that employed by Ebner et al.

Japanese Patent Publication No. 55,193-1981, published May 15, 1981 discloses a process which enables the production of vinegar containing more than 20% acetic acid whereby a vinegar mash is fermented at 27°-32° C. until the acetic acid concentration reaches 12-15% and then the temperature is decreased by less than 2° C. for every 1-2% increase in acetic acid concentration.

Japaese Patent Publication No. 61,987-1981, published May 27, 1981 discloses a semi-continuous vinegar fermentation process. A vinegar mash is aerobically incubated at 27°-31° C. until the acetic acid concentration is 12-15%. A major portion of the mash is transferred to a second fermentator, mixed with additional ethanol and incubated at above 18° C. to obtain an acetic acid concentration of at least 20%. In the meantime, fresh mash is added to the first fermentor to continue the fermentation.

It is an object of this invention to provide an improved process for producing vinegar by the aerobic fermentation of ethanol.

It is another object of this invention to provide a process for producing vinegar at concentrations greater than about 15% acetic acid by the aerobic fermentation of ethanol.

It is a further object of this invention to provide a process which utilizes membrane filtration for producing vinegar at acetic acid concentrations greater than about 15%.

The achievement of these and other objects will be apparent from the following description of the subject invention.

SUMMARY OF THE INVENTION

In accordance with the present invention it has been found that significant improvements can be achieved in the production of vinegar by the aerobic bacterial oxidation of ethanol in a combination of semi-continuous and batch fermentation together with membrane filtration of the fermentation mash from the semi-continuous stage whereby a product having an acetic acid concentration of above about 18% is produced. In particular, the fermentation mash is subjected to semi-continuous fermentation in at least two fermentors until the acetic acid level is about 10-12%, the mash is then membrane filtered, the filtrate is recovered as a 10-12% vinegar product and the concentrated mash containing vinegar bacteria is subjected to batch fermentation at a substantially lower temperature than that of the semi-continuous fermentation until the acetic acid concentration is about 18-20% at which point the batch fermentation is terminated and the mash is filtered to provide an 18-20% vinegar product. Two embodiments are preferred, the first, part of the concentrate recovered from the membrane filter is recycled to the semi-continuous fermentor and the balance is passed to the batch reactor. In the second, none of the concentrate is recycled, all of it goes to the batch reactor. A net of 50% of the contents of a semi-continuous fermentor is removed in the first embodiment, with 30% recovered as 10-12% vinegar and 20% recovered as the concentrate passed to the batch fermentor (an additional quantity of concentrate is recycled in this embodiment). In the second embodiment a net of 30% of the contents of a semi-continuous fermentor is removed, with 20% recovered as 10-12% vinegar and 10% recovered as the concentrate passed to the batch fermentor.

More particularly, this invention relates to a process of producing vinegar by the aerobic bacterial fermentation of ethanol to produce a liquid product comprising at least about 18% acetic acid, which comprises:

(a) subjecting a mixture comprising ethanol, nutrients and vinegar bacteria to aerobic fermentation in at least two semi-continuous fermentation reactors under operating conditions effective to provide a liquid comprising about 10 to about 12% acetic acid, (b) removing a first portion of the fermentation mixture comprising ethanol, acetic acid and vinegar bacteria from each semi-continuous fermentation reactor, (c) combining said first portion with an oxygen-containing gas substantially immiscible with said first portion producing a two phase liquid-gas mixture, the nature and quantity of said gas being effective to cause substantially more of the alcohol and acetic acid in said first portion to pass in tangential flow fashion through a filter membrane as the filtrate thereof, than if said liquid product were subjected to substantially the same tangential flow membrane filtration without having being combined with said gas, (d) subjecting said two phase liquid-gas mixture to tangential flow membrane filtration effective to separate said first portion into a second portion of alcohol and acetic acid and a concentrate of substantially all of the vinegar bacteria and the remaining ethanol and acetic acid from said first portion, said filter membrane having a porosity of less than 0.5 μm, (e) recovering said second portion as a vinegar product comprising about 10 to about 12% acetic acid.

(f) passing part of said concentrate to a batch fermentation reactor, (g) adding a feed mixture comprising ethanol and nutrients to said batch fermentation reactor in an amount effective to provide, together with said part of said concentrate of step (f), a fermentable mixture under the operating conditions employed in said batch reactor, (h) subjecting the mixture in said batch reactor to aerobic fermentation under batch operating conditions effective to provide a liquid comprising about 18 to about 20% acetic acid, said operating conditions including a temperature substantially lower than that employed in the semi-continuous fermentation of step (a), (i) subjecting said mixture in said batch reactor of step (h) to filtration to provide a vinegar product comprising about 18 to about 20% acetic acid, and (j) after removing said first portion in step (b), adding a feed mixture comprising ethanol and nutrients to each said semi-continuous fermentation reactor in an amount effective to provide, together with the portion of said mixture of step (a) remaining after said first portion is removed from each semi-continuous fermentation reactor, a fermentable mixture under the operation conditions employed in each semi-continuous fermentation reactor.

In one preferred embodiment, the 10–12% vinegar product recovered from a semi-continuous fermentation reactor is about 30% of the semi-continuous reactor contents, part of the concentrate from the membrane filter is sent to the batch fermentation reactor, said part being about 20% of the contents of the semi-continuous fermentation reactor and the remaining part of the concentrate is recycled to the semi-continuous fermentation reactor.

In another preferred embodiment, the 10–12% vinegar product recovered from a semi-continuous fermentation reactor is about 20% of the semi-continuous reactor contents and the concentrate from the membrane filter which is sent to the batch fermentation reactor is about 10% of the semi-continuous reactor contents.

In another embodiment, the vinegar bacteria recovered from the membrane filter is passed to a semi-continuous reactor or the batch fermentation reactor in a period of time effective to maintain the bacteria in a physiologically active condition.

In further embodiments, the membrane filtration is microfiltration or ultrafiltration.

In yet another embodiment three to six semi-continuous fermentation reactors are employed.

In still another embodiment, the batch fermentation temperature is about 8° to about 12° C., preferably about 10° C., lower than the semi-continuous fermentation temperature.

DESCRIPTION OF THE PREFERRED EMBODIMENTS

Figure 1:
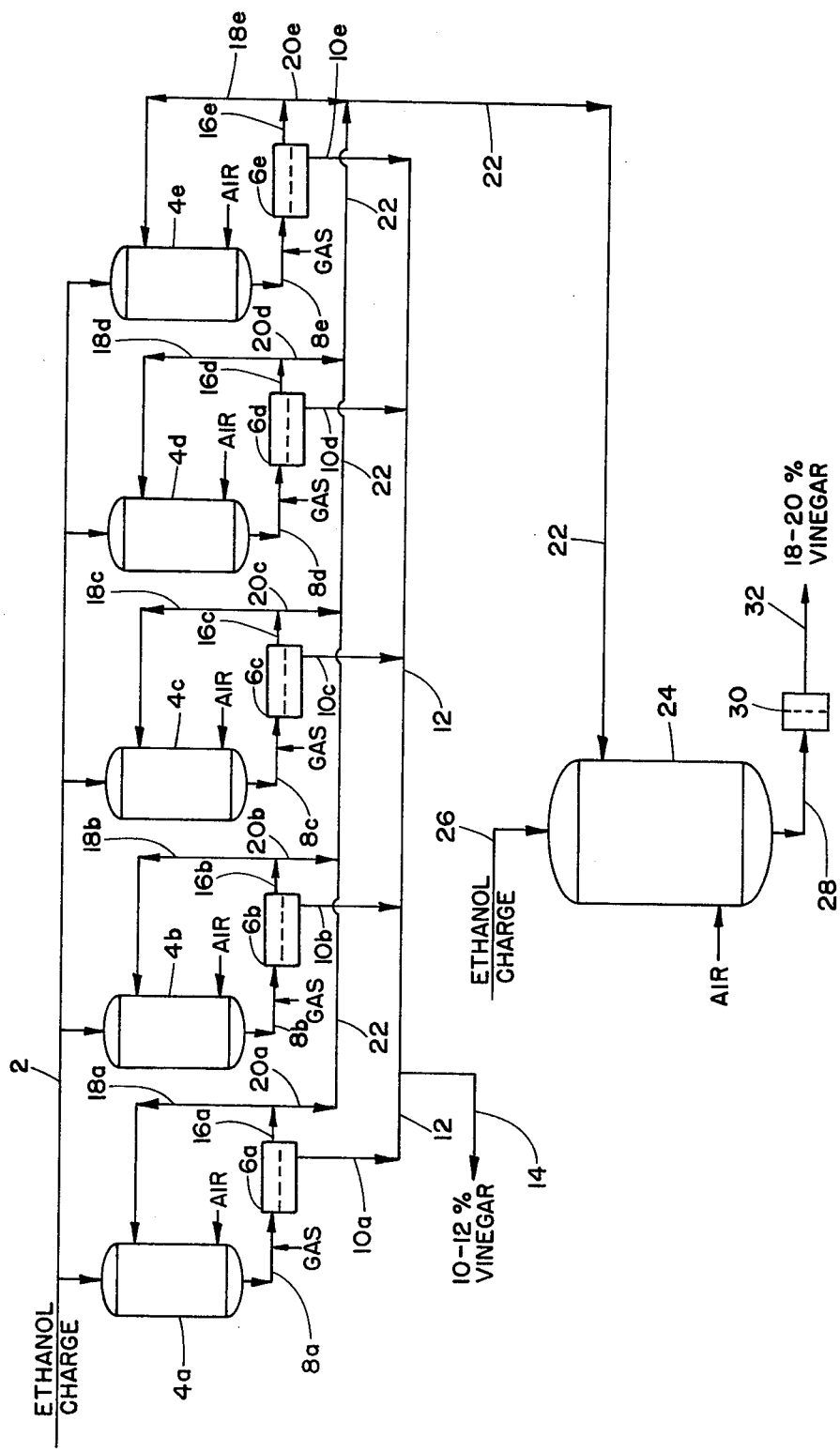
FIGS. 1 and 2 are schematic flowplans of embodiments of the invention.

The present process relates to improvements in the process of producing vinegar by aerobic bacterial fermentation and membrane filtration and in particular to a combination of semi-continuous and batch fermentation coupled with membrane filtration to provide a product having an acetic acid concentration of at least 18%.

In the production of vinegar, an ethanol feed is subjected to aerobic fermentation conditions in the presence of a strain of Acetobacter, known in the art as vinegar bacteria. As the oxidation proceeds, the concentration of acetic acid increases while the concentration of ethanol decreases. Since commercial vinegar contains about 4–8% acetic acid, when the acid concentration in the fermentor achieves this range, the mash can be withdrawn for processing to provide the product vinegar. It is often preferred to continue the fermentation until the acetic acid concentration is at least 10% so as to further reduce the alcohol concentration in the mash. In the latter situation, the alcohol level in the final product will therefore be further reduced when the product is diluted to the acid level of the commercial product.

In the practice of the present invention, ethanol is aerobically fermented to provide vinegar having a high acid concentration, i.e., acetic acid content of about 18 to about 20%. Briefly, this process employs a combination of semi-continuous fermentation and batch fermentation together with membrane filtration. An ethanol-vinegar bacteria mash is initially aerobically fermented in at least two semi-continuous fermentators to provide a membrane filtered vinegar having a 10–12% acetic acid content. The fermentation of at least a portion of the concentrated mash recovered from the membrane filter associated with each semi-continuous fermentor is continued in a batch fermentor at a substantially lower temperature than that employed in the semi-continuous fermentors until the acid content reaches the desired level of 18–20%.

When producing vinegar by fermentation of ethanol, a 10–12% product can be effectively provided by employing a fermentation temperature of about 30° C. If the fermentation is continued to obtain a more concentrated vinegar the effort is often counterproductive. Not only is the growth of vinegar bacteria supressed by high temperature as well as by high acid concentration but either condition can eventually kill the essential bacteria. This problem is minimized in the present invention by recovering a portion of the 10–12% vinegar as product and converting the remainder of the 10–12% vinegar in the concentrate recovered from the membrane filter to a 18–20% product by conducting the second stage of the fermentation at a substantially lower temperature than that employed in the first stage.

As used herein, a substantially lower temperature is a temperature which is about 8° to about 12° C., preferably about 10° C., lower than the temperature in question. Thus, where the first stage fermentation (the semi-continuous fermentation) is conducted at about 27.5° to about 32.5° C., the second stage fermentation (the batch fermentation) can be conducted at about 17.5° to about 22.5° C.

In practicing this invention, it has been found that the batch fermentor can conveniently process the 10–12% vinegar product in the mash concentrate from more than one semi-continuous fermentor. Thus, although at least two semi-continuous fermentors should be provided, the optimum number, in most situations, will usually be from three to six, with five being the usual optimum number. It should be appreciated that in a particular situation more than six semi-continuous fermentors could be effectively used.

During the initial start-up period, the acetic acid level is slowly increasing in a semi-continuous fermentor. When it reaches the 10–12% acid level, a quantity of the fermentation mash is intermitently withdrawn and subjected to membrane filtration to obtain a concentrated mash and a clear vinegar stream. The filtered 10–12% vinegar is recovered as product while all or part of the concentrated mash is passed to the batch reactor. Any remaining portion of the concentrated mash is recycled to the semi-continuous reactor. The concentrated mash contains vinegar bacteria plus a portion of the liquid removed from the semi-continuous fermentor.

In addition to the concentrate from the membrane filter, which serves as the feed to the batch fermentor, quantities of ethanol and vinegar food, i.e., nutrients, such as dextrose, autolyzed yeast, malt sprout extract and $(NH_4)_2 PO_4$ or other nutrient compositions well known in the art) must also be supplied to the batch fermentor, as required. After the aerobic fermentation causes the acetic acid level in the batch fermentor to reach the level of 18–20%, the fermentation is terminated. Since most, if not all, of the vinegar bacteria will have been killed at the higher acid levels, the batch reactor contents are filtered to remove the dead bacteria for disposal. Membrane filtration need not be employed here. Less costly filtering systems are satisfactory.

In processing the fermented mash from a semi-continuous fermentor, it is preferred to recover some of the vinegar bacteria and return it to the semi-continuous fermentor so as to increase the bacteria level therein, thereby causing a concomitant increase in the rate of fermentation. This procedure is employed in one of the preferred embodiments. In practicing the present invention, it has been found convenient to employ a tangential flow membrane filter to effect the bacteria separation, as has been employed in the prior art. However, the present invention can employ an improvement over the procedure practiced heretofore which is disclosed in the commonly assigned and copending patent application referred to hereinabove. In the prior art process, only a portion of the liquid passed through the membrane of the filter, the remaining liquid served as the carrier to return the bacteria to the fermentor. In the process of the copending application, it was found that by admixing quantities of gas with the mash as it was being passed to the membrane filter, it was possible to cause substantially more of the liquid in the mash to pass through the membrane of the filter where it was recovered as filtrate. In the meantime, the vinegar bacteria were swept through the upstream side of the filter by the gas stream and the remaining liquid and were returned to the fermentor.

Although the physiology of the bacteria depends on the presence of an adequate supply of oxygen, the prior art has disclosed that vinegar bacteria will not be adversely affected to any substantial degree if the time outside of the fermentor during transfer is less than one minute. Therefore if the present invention is practiced by employing a non-molecular oxygen containing gas, the transfer time should be no more than one minute. However, if molecular oxygen containing gas is employed in the present invention, the transfer time need not be limited to one minute, provided sufficient molecular oxygen is provided to maintain the physiological activity of the vinegar bacteria. One skilled in the art can ascertain the effective oxygen level for the particular transfer arrangement being employed without an undue amount of experimentation.

Membrane filtration is a known procedure which can remove particulate matter from a liquid. Both microfiltration and ultrafiltration can be employed to remove the bacteria from a vinegar fermentation mash. In most vinegar applications, the "molecular weight" filtration provided by ultrafiltration is not essential. Microfiltration satisfactorily removes the vinegar bacteria from the fermentation mash and is therefore the preferred mode in the process of the present invention.

Membrane filter media are porous membranes of regenerated cellulose or synthetic polymers. In the present invention, since the acetic acid can damage a cellulose acetate membrane, acid resistant membranes are employed. Membranes made of cellulose nitrate, regenerated cellulose, polyamide, polysulfone, acrylonitrile, polytetrafluoroethylene (PTFE), polycarbonate and the like are usefully employed here. The porosity of the membrane should be sufficient to retain the vinegar bacteria and other matter whose presence in the product vinegar is undesirable. Where ultrafiltration employing hollow fibers and the like is used, a molecular weight fractionation of about 10,000 and greater will be efficient in the present process. In fact, a molecular weight fractionation of 1,000,000 is usually more than adequate if ultrafiltration is employed. In the preferred embodiment which employs microfiltration, membranes having a porosity of about 0.1–0.5 $\mu$m, preferably about 0.15–0.3 $\mu$m, are satisfactory for removing vinegar bacteria and providing a clear vinegar product for commercial sale. Thus the process of this invention is practiced with ultrafiltration membranes having a molecular weight fraction of about 10,000 and greater or with microfiltration membranes having a porosity less than about 0.5 $\mu$m, preferably less than about 0.3 $\mu$m and with the liquid to be filtered being passed in a tangential fashion over the membrane. Particularly useful are the tangential flow membrane filters manufactured for example, by Sartorius Filters, Inc., by Millipore Corporation and by Amicon Corporation. This type of flow prevents blocking of the membrane pores by sweeping the residue off the membrane surface.

The factor that causes substantially more of the liquid in the fermented mash to pass through the filter than in other processes is the addition of a stream of gas to the line carrying the mash to the membrane filter at a point upstream of the membrane filter. This gas must be of a quality and a quantity that will effectively cause substantially more of the mash liquid to pass through the filter membrane while having either beneficial or no detrimental effect on the liquid mash or the vinegar bacteria. Such gases as carbon dioxide, nitrogen and the like and such molecular oxygen-containing gases as air, oxygen and mixtures of oxygen and the non-oxygen-containing gases may be employed. In the preferred operation, molecular oxygen containing gases, especially air are used. Where no molecular oxygen-containing gases are employed, the vinegar bacteria must be transferred to the fermentor in less than one minute. However, where a molecular oxygen containing gas is employed in a quantity effective to maintain the vinegar bacteria in a physiologically active condition, there is no such time restriction when transferring the vinegar bacteria. The quantity of gas required to cause substantially more of the mash liquid to pass through the filter membrane while retaining the vinegar bacteria depends on a variety of factors including inter alia the porosity of the membrane, in the case of microfiltration, the molecular weight cut-off, in the case of ultrafiltration, the membrane surface area, the rate of flow of the fermented mash to the membrane filter, the composition of the fermented mash, the composition of the added gas, the physical make-up of the transfer system, etc. It is difficult to suggest volume requirements unless a number of other variables are also specified and, further, it would provide little information for other than the system described. However, one skilled in the art can readily determine the gas requirements for a system handling a particular fermented mash without an undue amount of experimentation.

It has not been determined why the addition of a gas stream to the fermented mash prior to its being passed to a membrane filter causes substantially more of the liquid in the mash to pass through the membrane in the micro or ultrafilter. In a prior art process which employs hollow fiber ultrafiltration to process a vinegar fermentation mash, only part of the liquid passes through the hollow fiber membranes for recovery, the remaining liquid reaching the ultrafilter is returned to the fermentor as a carrier for the vinegar bacteria. Typically, about a 1:10 split between the clear liquid mash passed through the membrane and the liquid mash passed back to the fermentor can be obtained by the prior art hollow fiber filtration of vinegar mash. By admixing gas with the mash to be filtered and by using the same euqipment, the ratio can be substantially improved, e.g., to about a 1:5 ratio. Similar improvements are obtained when gas is admixed with a vinegar fermentation mash prior to membrane microfiltration of the mash, e.g., an improvement from a ratio of about 1:1 to about 2:1.

The improvements described herein can be illustrated by reference to FIG. 1 which presents a flowplan of one preferred embodiment of this invention. In this description, five semi-continuous fermentators, and one batch fermentor are employed for illustrative purposes. Those skilled in the art will appreciate that similar beneficial results can be obtained with other than five semi-continuous fermentators or with several batch fermentors, where a particular situation would indicate some advantage.

An alcohol charge containing 70-80 vol.% of water, 10-20 vol.% of 10-11% vinegar, 10-15 vol.% of 95% ethanol and 0.1-0.2 vol.% of vinegar food is charged through line 2 into any of the semi-continuous fermentors 4a, 4b, 4c, 4d or 4e. Each fermentor is equipped with a mixer, a heating/cooling coil, an air sparger and a gas vent and each has associated therewith a membrane filter 6a, 6b, 6c, 6d or 6e. For convenience, the semi-continuous fermentation will be described utilizing semi-continuous fermentor 4a and its attendant equipment. It will be understood that fermentors 4b and 4c, 4d and 4e are operated in a similar fashion. Those skilled in the art will appreciate that since the initial fermentation is semi-continuous, a single membrane filter may be sufficient instead of a filter for each semi-continuous fermentor as described here.

Once the alcohol charge is introduced into semi-continuous fermentor 4a, air is supplied to the sparger to maintain the bacteria in an active condition. Fermentation is initiated by starting the mixer and heating the fermentor contents to about 30° C. by means of the heating/cooling coil. As the fermentation proceeds the ethanol is oxidized to acetic acid, gaseous fermentation products are vented from fermentator 4a while air is supplied continuously and the heating/cooling coil is used to maintain about 30° C. in the fermenting mash.

When the acetic acid concentration in the fermenting mash reaches the desired level of about 10 to about 12%, the mash, together with the bacteria, is passed from the bottom of fermentor 4a through line 8a where gas, such as air, oxygen or a mixture of air and nitrogen or carbon dioxide, is introduced. The gas and the mash are intimately mixed during passage through line 8a. The gas-mash mixture enters microfilter 6a which is equipped with an acid-resistant membrane having a pore size of 0.2 μm which will retain the bacteria. The mixture passes through the microfilter in a tangential flow pattern. A major portion of the liquid in the mash passes through the membrane as filtrate and flows through line 10a to lines 12 and 14 to a recovery area (not shown) where the 10-12% vinegar liquid is diluted with water to provide vinegar of the required commercial strength. The gas, the vinegar bacteria and a minor portion of the liquid in the mash do not pass through the filter membrane but pass from microfilter 6a through lines 16a as a concentrate. The use of gas during the microfiltration permits a ratio of filtrate to concentrated mash (also referred to as concentrate) of about 2:1 which is an improvement over the ratio of about 1:1 obtained without the addition of gas.

The concentrate passing from microfilter 6a is split with a portion of it recycled through lines 16a and 18a to fermentor 4a where the bacteria is reused. The remaining portion of the concentrate passes through lines 20a and 22 to batch fermentor 24 and further fermentation.

The filtration of the mash from fermentor 4a is continued until about 50% of the fermentor contents are removed. This will provide about 30% of the fermentor contents as 10-12% vinegar product through line 14 and about 20% of the fermentor contents as concentrate passing to batch fermentor 24 through line 22.

In a similar fashion, semi-continuous fermentation, filtration and transfer is conducted in fermentors 4b, 4c, 4d and 4e and each of their attendant equipment and lines (identified by the suffix b, c, d or e, respectively) to provide additional quantities of 10-12% vinegar product passing through line 14 and concentrated mash passing through line 22.

The operation of the several semi-continuous fermentors is coordinated with the operation of the batch reactor. Where necessary, an additional batch reactor may be required to obtain more effective operation of the semi-continuous fermentors, particularly where they number three or more.

Returning to batch fermentor 24, when the concentrates from a sufficient number of semi-continuous fermentors have been transferred to fermentor 24 to provide an adequate batch, a supplemental ethanol charge of ethanol and vinegar bacteria from line 26 is added to fermentor 24 to provide a mixture susceptible to batch fermentation to an acetic acid level of about 18 to about 20%. Batch fermentor 24 is equipped in a fashion similar to the semi-continuous fermentators so as to control the fermentation conditions within the desired limits. The batch fermentation is conducted at a temperature of about 20° C. which permits the fermentation to proceed to the 18-20% acetic acid level despite the fact that substantial quantities, if not all, of the vinegar bacteria are killed at this high acid level. When the desired acid level is reached in fermentor 24, the fermentation is discontinued and the fermentor contents are passed through line 28 to filter 30 for removal of the vinegar bacteria (now mostly dead) from the vinegar. Filter 30 need not be a microfilter or an ultrafilter. Any filter capable of providing a clear vinegar product will be satisfactory. The 18-20% vinegar filtrate flows through line 32 to a recovery area (not shown) where it is diluted to the required commercial strength.

Figure 2:
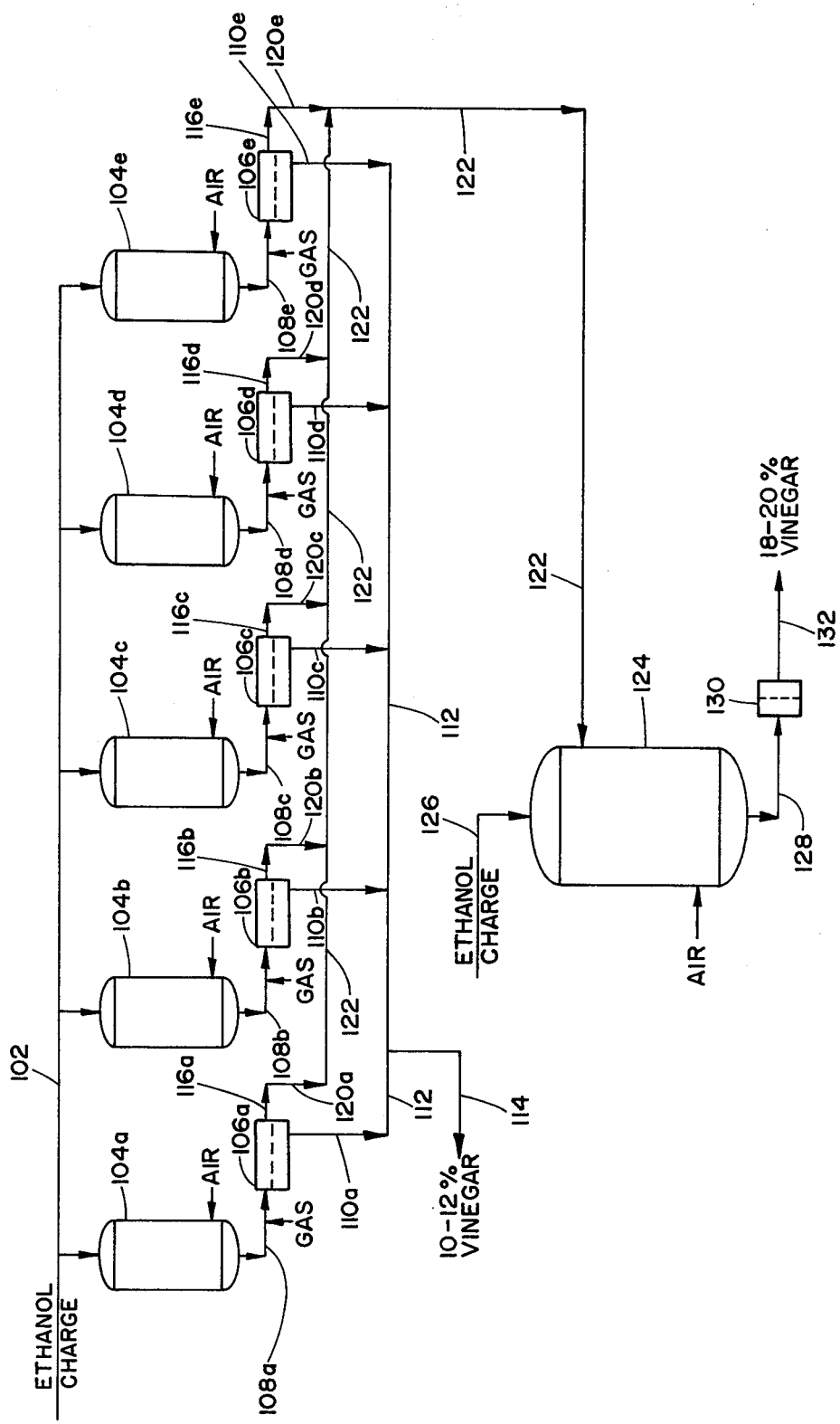

FIG. 2 presents a flowplan of another preferred embodiment of this invention. This embodiment is the same in all respects to the embodiment depicted in FIG. 1 and described hereinbefore except that none of the concentrate from a microfilter associated with a semi-continuous fermentor is recycled to the semi-continuous fermentor. Therefore, to facilitate the description of the embodiment depicted in FIG. 2, the equipment and lines therein will carry the same identification as in FIG. 1 except that 100 has been added hereto, viz., semi-continuous fermentor 4a of FIG. 1 is semi-continuous fermentor 104a in FIG. 2, line 22 of FIG. 1 is line 122 of FIG. 2, etc. However, because of the difference in these two embodiments, there are no lines 118a, b, c, d or e in FIG. 2.

Therefore the description of FIG. 1 may be referred to for an understanding of FIG. 2, with the proviso that 100 is added to the identifying numbers and with the following modifications. Although the use of gas during the microfiltration also permits a ratio of filtrate to concentrate of about 2:1, the concentrate in FIG. 2 is not split. All of the concentrate from microfilter 106a passes through lines 116a, 120a and 122 to batch fermentor 124. Further, the filtration of the mash from fermentor 104a is continued until about 30% of the fermentor contents are removed. This will provide about 20% of the fermentor contents as 10-12% vinegar product through line 114 and about 10% of the fermentor contents as concentrate passing to batch fermentor 124 through line 122. In other respects these two embodiments are similar.

During the microfiltration, the quantity of gas supplied to the fermented mash must be sufficient to cause a major portion of the mash liquid to pass through the microfilter membrane. Further, where no molecular oxygen gas is provided upstream of a microfilter used in the semi-continuous fermentation, the flow rate in the transfer system must be sufficiently high so that the bacteria is not denied an oxygen environment for an excessive period which could result in causing the death of a significant portion of the bacteria. Usually a transfer time of less than one minute will be adequate in this situation. Of course, when quantities of molecular oxygen containing gas effective to sustain the bacteria are provided, transfer times in excess of one minute are acceptable.

The improvements described in copending application Ser. No. 437,425 can be illustrated by reference to FIG. 3 which presents a flowplan of an embodiment of the invention of said application. In this description, a microfilter is employed for illustrative purposes. Those skilled in the art will appreciate that similar beneficial results are obtained with an ultrafilter. An alcohol charge containing 70-80 vol.% of water, 10-20 vol.% of 10-11% vinegar, 10-15 vol.% of 95% ethanol and 0.1-0.2 vol.% of vinegar food is charged through line 202 into fermentor 204. The fermentor is equipped with mixer 206, heating/cooling coil 208, air sparger 210 and gas vent 212. Once the aerobic bacteria is introduced into the fermentor, air must be supplied to sparger 210 through line 214 to maintain the bacteria in an active condition. To initiate the fermentation, mixer 206 is started and the fermentor contents are heated to a temperature in the range of 20-40° C. by means of heating/cooling coil 208. When the desired temperature is obtained, the fermentation proceeds with the ethanol being oxidized to acetic acid. Any gaseous fermentation products are vented through gas vent 212. During the fermentation, the air supplied to sparger 210 is maintained at an appropriate level and the temperature in the fermentor is adjusted as required by means of heating/cooling coil 208. When the acetic acid concentration in the fermenting mash reaches the desired level, usually above about 10%, the mash together with the bacteria passes from the bottom of fermentor 204 through line 216 to pump 218 which pumps the mash through the recycle and recovery system. Gas, such as nitrogen, carbon dioxide, oxygen, air or mixtures thereof, is introduced through line 220 into line 216. The gas and the mash are intimately mixed during passage through pump 218. The gas-mash mixture passes through line 222 and enters microfilter 224 which is equipped with an acid-resistant membrane 226 having a pore size of 2 $\mu$m which will retain the bacteria. The mixture passes through the microfilter in a tangential flow pattern. A major portion of the liquid in the mash passes through membrane 226 and flows through line 228 to a recovery area (not shown) where the strong vinegar liquid is diluted with water to provide vinegar of the required commercial strength. The air, the vinegar bacteria and a minor portion of the liquid do not pass through membrane 226 but pass from microfilter 224 through line 230 for recycle to fermentor 204 where the bacteria is re-used.

The process can be operated in a continuous or semi-continuous fashion. In a continuous operation, an alcohol charge is added continuously at a rate commensurate with the rate of flow of the mash leaving the fermentor through line 216, the production rate of vinegar-rich liquor passing from the microfilter through line 228 and the rate of return of bacteria to the fermentor through line 230 so that the level of the fermenting mash in fermentor 204 remains substantially constant. In semi-continuous operation, a major portion of the mash in fermentor 204 is removed periodically when the desired acetic acid concentration is obtained. The mash is passed through the microfilter together with gas from line 220. A vinegar-rich stream is recovered and the bacteria is recycled to the fermentor. Following this recovery, an additional alcohol charge is introduced into the fermentor to return the level in the fermentor to its former level and the fermentation is continued.

During microfiltration, the quantity of gas supplied through line 220 must be sufficient to cause a major portion of the mash liquid to pass through the microfilter membrane. Further, where no molecular oxygen gas is provided through line 220, the flow rate in the recycle system, viz., lines 216, 222 and 230, must be sufficiently high so that the bacteria is not denied an oxygen environment for an excessive period which could result in causing the death of a significant portion of the bacteria. Usually a cycle time of less than one minute will be adequate in this situation. Of course, when quantities of molecular oxygen containing gas effective to sustain the bacteria are provided through line 220, recycle times in excess of one minute are acceptable.

In some instances, it may not be necessary to recycle all or any of the bacteria to the fermentor or microfiltration of the mash may not be desired. In either event, the mash may be pumped from the fermentor and all or a portion of it may be recovered through line 232 at a point upstream of microfilter 224.

The following examples illustrate the practice of the invention disclosed in copending application Ser. No. 437,425.

EXAMPLE 1

A series of tests were made to evaluate the process of the invention disclosed in copending application Ser. No. 437,425.

Figure 3:
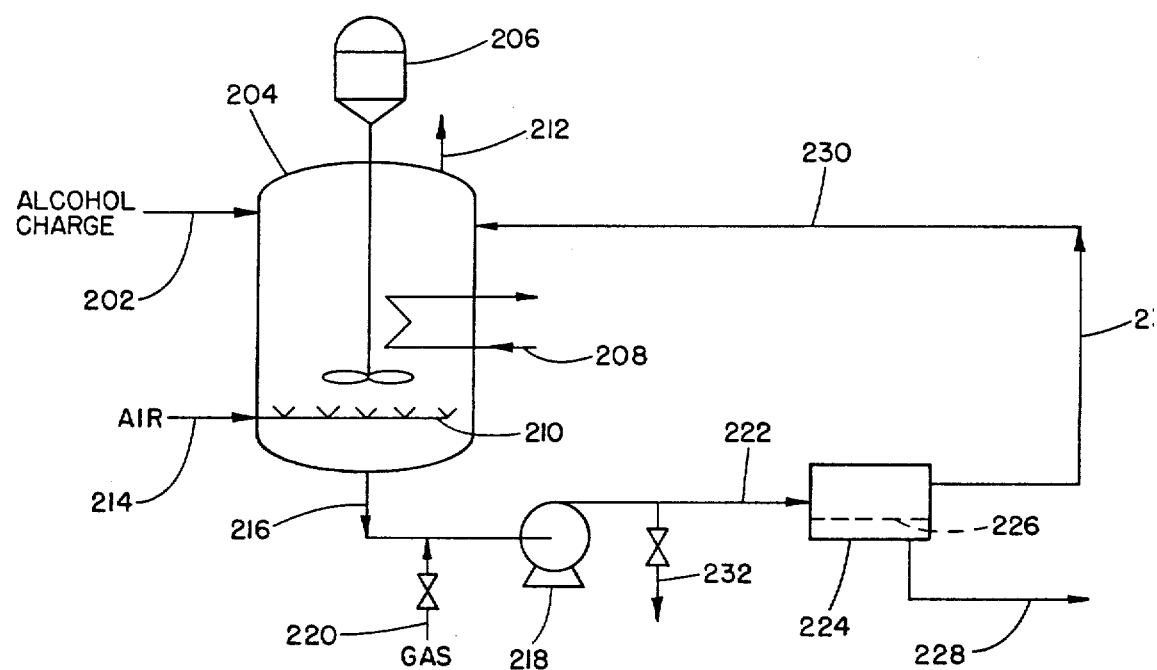
FIG. 3 is a schematic flowplan illustrating the membrane filtration disclosed in copending application Ser. No. 437,425 and employed in this invention.

The equipment was arranged in a manner similar to that of FIG. 3. The fermentation vessel had a working volume of 7.5 liters and was equipped with an adjustable and measurable source of air. Temperature was controlled in the vessel by a thermostat and water circulation. A microfiltration system arranged to handle the fermentation mash from the fermentation vessel consisted of filtration cells employing the tangential flow principle, a liquid pump and an air pump. The microfilter membrane was composed of regenerated cellulose and had a pore size of 0.2 μm.

Acetator Operation: The acetator was operated on a semi-continuous basis. During control runs, when the alcohol concentration in the fermentation mash (vinegar) dropped to 0.5–0.25%, one-third of the fermentation mash (2.5 liters) was discharged without filtration and replaced with 2.5 liters of a fresh alcohol charge. For a cell-return system operation, in accordance with the invention of the copending application, when the alcohol concentration in the fermentation mash (vinegar) dropped to 0.5–0.25%, one-half of the fermentation mash (3.75 liters) was discharged through the microfilter and replaced with 3.75 liters of a fresh alcohol charge.

The operating conditions were:

| Temperature | 30° C. |
|---|---|
| Aeration rate | 50 liters/hour |

The alcohol charge had the following composition per liter:

| ethanol (190 proff) 133 ml | 13.3% |
|---|---|
| Vinegar (110 grain) 100 ml | 10% |
| Nutrient 1.36 grams | 01–02% |
| tap water to complete the volume to 1 liter | 76.7% |

The experimental results are presented below: Cycle nos. 1–3 are control runs while cycle nos. 4–10 are the cell-return system operation of the invention of the copending application.

| Cycle No. | Age Hour | Ethanol % | Acetic Acid % | Volume, liters charge, (c) disch. (d) | Rate g/L/hr. | Conversion grain/L/ proof |
|---|---|---|---|---|---|---|
| 1 | 0 | 3.6 | 7.8 | 2.5 (c) | | |
|   | 33 | 0.5 | 12.6 | 2.5 (d) | 1.5 | 4.6 |
| 2 | 0 | 3.4 | 8.7 | 2.5 (c) | | |
|   | 33 | 0.5 | 11.5 | 2.5 (d) | 0.8 | 4.2 |
| 3 | 0 | 3.4 | 8.3 | 2.5 (c) | | |
|   | 37 | 0.6 | 12.1 | 2.5 (d) | 1.0 | 4.4 |
| 4 | 0 | 3.4 | 8.5 | 2.5 (c) | | |
|   | 31 | 0.4 | 12.3 | 3.75 (d) | 1.2 | 4.5 |
| 5 | 0 | 4.7 | 7.1 | 3.75 (c) | | |
|   | 38 | 0.5 | 12.6 | 3.75 (d) | 1.4 | 4.6 |
| 6 | 0 | 5.1 | 7.3 | 3.75 (c) | | |
|   | 40 | 0.6 | 12.3 | 3.75 (d) | 1.3 | 4.5 |
| 7 | 0 | 4.8 | 7.3 | 3.75 (c) | | |
|   | 36 | 0.5 | 12.5 | 3.75 (d) | 1.4 | 4.6 |
| 8 | 0 | 5.1 | 6.6 | 3.75 (c) | | |
|   | 36 | 0.6 | 11.9 | 3.75 (d) | 1.5 | 4.3 |
| 9 | 0 | 5.4 | 6.6 | 3.75 (c) | | |
|   | 36 | 0.4 | 12.1 | 3.75 (d) | 1.5 | 4.4 |
| 10 | 0 | 3.6 | 7.9 | 3.75 (c) | | |
|    | 33 | 0.5 | 12.8 | 3.75 (d) | 1.5 | 4.7 |

These data demonstrate that when operating in accordance with the invention of the copending application significantly more of the acetator contents may be discharged per cycle while maintaining, and in some instances improving, the rate of vinegar production.

EXAMPLE 2

Two series of six runs each were made in a manner similar to those of cycle nos. 4–10 of Example 1 except that in one series of runs no air was admixed with the fermentation mash upstream of the microfilter. The results, based on the six runs in each series, are presented below.

| | Filtration Conditions | |
|---|---|---|
| | without air | with air |
| Volume discharged for filtration (ml.) | 3750 | 3750 |
| Filtration cycle (min.) | 8 | 15 |
| Filtrate volume (ml.) | 1875 | 2500 |
| Cell Concentrate volume (ml.) | 1875 | 1250 |
| Ratio, filtrate/concentrate | 1:1 | 2:1 |

These data show the improvements in membrane filtration when gas is admixed with the liquid to be filtered.

EXAMPLE 3

Another evaluation was performed in accordance with cycle nos. 4–10 of Example 1. Here the vinegar discharge pump rate was 820 ml/minute and the air pump rate was 172 ml/minute with the pressure at the microfiltration unit being 10–15 psig. Filtered vinegar was produced at the rate of 500 ml/minute while that for the concentrated vinegar bacteria was 320 ml/minute for a filtrate/concentrate ratio of 1.56:1.

EXAMPLE 4

The practice of the invention of the copending application was demonstrated in an ultrafilter employing hollow fibers. The hollow fiber cartridge was composed of polysulfone and had a 100,000 molecular weight cutoff (fractionation). The ultrafilter was evaluated by passing fermentation mash therethrough with and without the addition of air. The experimental results are presented below.

|  | Flow rate, ml./sec |  | |
|---|---|---|---|
|  | Vinegar Filtrate | Vinegar Bacteria Concentrate | Ratio Filtrate: Concentrate |
| without air | 2.5 | 21.7 | 1:8.7 |
| with air | 2.0 | 10.0 | 1:5.0 |

These data suggest that the practice of the invention of the copending application provides substantial improvement in microfiltration as well as in ultrafiltration.

We claim:

1. A process of producing vinegar by the aerobic bacterial fermentation of ethanol to provide a liquid product comprising at least about 18% acetic acid, which comprises: p1 (a) subjecting a mixture comprising ethanol, nutrients and vinegar bacteria to aerobic fermentation in at least two semi-continuous fermentation reactors under operating conditions effective to provide a liquid comprising about 10 to about 12% acetic acid, (b) removing a first portion of the fermentation mixture comprising ethanol, acetic acid and vinegar bacteria from each semi-continuous fermentation reactor, (c) combining said first portion with an oxygen-containing gas substantially immiscible with said first portion producing a two phase liquid-gas mixture, the nature and quantity of said gas being effective to cause substantially more of the alcohol and acetic acid in said first portion to pass in tangential flow fashion through a filter membrane as the filtrate thereof, than if said portion were subjected to substantially the same conditions in the absence of said gas, (d) subjecting said two phase liquid-gas mixture to tangential flow membrane filtration effective to separate said first portion into a second portion of alcohol and acetic acid and a concentrate of substantially all of the vinegar bacteria and a remaining portion of ethanol and acetic acid, said filter membrane having a porosity of less than 0.5 μm, (e) recovering said second portion as a vinegar product comprising about 10 to about 12% acetic acid.

(f) passing part of said concentrate to a batch fermentation reactor, (g) adding a feed mixture comprising ethanol and nutrients to said batch fermentation reactor in an amount effective to provide, together with said part of said concentrate of step (f), a fermentable mixture, (h) subjecting the mixture in said batch reactor to aerobic fermentation under batch operating conditions effective to provide a liquid comprising about 18 to about 20% acetic acid, said operating conditions including a temperature substantially lower than that employed in the semi-continuous fermentation of step (a), (i) subjecting said mixture in said batch reactor of step (h) to filtration to provide a vinegar product comprising about 18 to about 20% acetic acid, and (j) after removing said first portion in step (b), adding a further feed mixture comprising ethanol and nutrients to each said semi-continuous fermentation reactor in an amount effective to provide, together with the portion of said mixture of step (a) remaining after said first portion is removed from each semi-continuous fermentation reactor, a fermentable mixture under the operating conditions employed in each semi-continuous fermentation reactor.

2. A process according to claim 1 including the following additional step:

(k) after passing part of said concentrate to a batch fermentation reactor in step (f), recycling the remaining part of said concentrate to the original semi-continuous fermentation reactor; said second portion of step (e) being about 30% of the contents of said semi-continuous fermentation reactor and said part of said concentrate of step (f) being about 20% of the contents of said semi-continuous fermentation reactor.

3. A process according to claim 1 wherein said second portion of step (e) is about 20% of the contents of the semi-continuous fermentation reactor and said concentrate of step (d) is about 10% of the contents of said semi-continuous fermentation reactor and said part of said concentrate of step (f) is all of said concentrate.

4. A process according to claim 1 wherein said part of said concentrate of step (f) is passed to said batch fermentation reactor under conditions effective to maintain the vinegar bacteria in a physiologically active condition.

5. A process according to claim 2 wherein said remaining part of said concentrate of step (k) is recycled to said semi-continuous fermentation reactor under conditions effective to maintain the vinegar bacteria in a physiologically active condition.

6. A process according to claim 4 wherein the conditions include a transfer time of less than one minute.

7. A process according to claim 4 wherein the conditions include a quantity of molecular oxygen effective to maintain the physiologically active condition of the vinegar bacteria while it is being transferred.

8. A process according to claim 7 wherein the molecular oxygen containing gas is air.

9. A process according to claim 5 wherein the conditions include a recycle time of less than one minute.

10. A process according to claim 5 wherein the conditions include a quantity of molecular oxygen effective to maintain the physiologically active condition of the vinegar bacteria while it is being recycled.

11. A process according to claim 10 wherein the molecular oxygen containing gas is air.

12. A process according to claim 1 wherein the membrane filtration of step (d) is microfiltration.

13. A process according to claim 1 wherein the membrane filtration of step (d) is ultrafiltration.

14. A process according to claim 1 wherein the number of semi-continuous fermentation reactors is 3 to 6.

15. A process according to claim 1 wherein the batch fermentation temperature is about 8° to about 12° C. lower than the semi-continuous fermentation temperature.

16. A process according to claim 13 wherein the batch fermentation temperature is about 10° C. lower than the semi-continuous fermentation temperature.

17. A process according to claim 1 wherein the operating conditions of the aerobic fermentation of steps (a) and (h) include temperatures of about 27.5° to about 32.5° C. and about 17.5° to about 22.5° C., respectively.

* * * * *

UNITED STATES PATENT AND TRADEMARK OFFICE
CERTIFICATE OF CORRECTION

PATENT NO. : 4,456,622

DATED : June 26, 1984

INVENTOR(S) : John A. Maselli et al.

It is certified that error appears in the above-identified patent and that said Letters Patent is hereby corrected as shown below:

In the drawings, Figure 3 should be added to appear as shown on the attached sheet.

Signed and Sealed this

Eighth Day of January 1985

[SEAL]

Attest:

GERALD J. MOSSINGHOFF

Attesting Officer

Commissioner of Patents and Trademarks